(12) United States Patent
Gorelkina

(10) Patent No.: US 8,990,792 B2
(45) Date of Patent: Mar. 24, 2015

(54) METHOD FOR CONSTRUCTING DYNAMIC CALL GRAPH OF APPLICATION

(75) Inventor: Ekaterina Gorelkina, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1030 days.

(21) Appl. No.: 12/471,506

(22) Filed: May 26, 2009

(65) Prior Publication Data
US 2009/0293049 A1 Nov. 26, 2009

(30) Foreign Application Priority Data

May 26, 2008 (RU) .............................. 2008120587
Apr. 27, 2009 (KR) ........................ 10-2009-0036569

(51) Int. Cl.
G06F 9/45 (2006.01)
G06F 11/36 (2006.01)

(52) U.S. Cl.
CPC ........ *G06F 11/3612* (2013.01); *G06F 11/3636* (2013.01); *G06F 11/3604* (2013.01); *G06F 11/36* (2013.01)
USPC .......................................... 717/157; 717/133

(58) Field of Classification Search
CPC .. G06F 11/3604; G06F 11/00; G06F 11/3636
USPC ................................. 717/133, 157
See application file for complete search history.

(56) References Cited

U.S. PATENT DOCUMENTS

| | | | |
|---|---|---|---|
| 5,307,492 A | 4/1994 | Benson | |
| 5,539,907 A | 7/1996 | Srivastava et al. | |
| 6,002,872 A | 12/1999 | Alexander, III et al. | |
| 6,049,666 A * | 4/2000 | Bennett et al. | 717/130 |
| 6,247,175 B1 * | 6/2001 | Ledford et al. | 717/157 |
| 6,553,564 B1 * | 4/2003 | Alexander et al. | 717/128 |
| 6,662,358 B1 | 12/2003 | Berry et al. | |
| 6,751,789 B1 | 6/2004 | Berry et al. | |
| 7,114,150 B2 | 9/2006 | Dimpsey et al. | |
| 8,473,928 B2 * | 6/2013 | Park et al. | 717/133 |
| 8,595,709 B2 * | 11/2013 | Rao et al. | 717/133 |
| 2002/0091995 A1 | 7/2002 | Arnold et al. | |
| 2003/0192036 A1 | 10/2003 | Karkare et al. | |
| 2005/0125777 A1 | 6/2005 | Calder et al. | |

(Continued)

FOREIGN PATENT DOCUMENTS

| | | |
|---|---|---|
| KR | 10-2001-0075872 | 8/2001 |
| KR | 10-2008-0022889 | 3/2008 |

OTHER PUBLICATIONS

"Grove et al";"A Framework for Call Graph Construction Algorithms";"Nov. 6, 2001";"62 pages"."vol. 23".*

*Primary Examiner* — Anna Deng
*Assistant Examiner* — Brahim Bourzik
(74) *Attorney, Agent, or Firm* — NSIP Law

(57) ABSTRACT

A method of generating a dynamic call graph of an application is disclosed. The method includes collecting information on what program code pages are accessed during each sampling period, defining parts of an executable program code which are accessible during each sampling period according to the collected information, defining a set of functions within the defined parts of the executable program code, generating dynamic call graphs using the defined set of functions for each sampling period, and generating dynamic call graphs for an observation period by combining accurate dynamic call graphs of each sampling period.

8 Claims, 2 Drawing Sheets

(56) References Cited

U.S. PATENT DOCUMENTS

| | | | |
|---|---|---|---|
| 2006/0218543 A1* | 9/2006 | Boger | 717/157 |
| 2007/0174817 A1* | 7/2007 | Fanning et al. | 717/124 |
| 2007/0234298 A1 | 10/2007 | Hirai et al. | |
| 2008/0148240 A1 | 6/2008 | Jones et al. | |
| 2008/0209403 A1 | 8/2008 | Kimura | |

* cited by examiner

METHOD FOR CONSTRUCTING DYNAMIC CALL GRAPH OF APPLICATION

CROSS REFERENCE TO RELATED APPLICATIONS

This application claims the benefit under 35 U.S.C. §119 (a) of a Russia Patent Application No. RU2008120587, filed on May 26, 2008, and a Korean Patent Application No. 10-2009-0036569, filed on Apr. 27, 2009, the disclosures of which are incorporated herein in its entirety by reference for all purposes.

BACKGROUND

1. Field

The following description relates to a digital information processing, and more particularly, to a call graph construction method.

2. Description of the Related Art

Dynamic call graph is abstraction used for representing execution paths of a program or an application. That is, dynamic call graph of functions is used to profile computer programs or applications. This information may be used to understand a behavior of the application and detect errors, and to perform an analysis of the application.

To obtain an accurate dynamic call graph, a method of tracing of all function calls in an application may be used. This method uses instrumentation of all functions of the application. Instrumentation may assume changes in a function code for information collection capability. During the tracing method, information about all executed functions is saved in the trace. However, this method may require a large amount of memory (or storage space), and slow down the application due to the overhead from collecting the information. Thus, obtaining an accurate dynamic call graph may be problematic with embedded systems with limited resources, especially for larger applications.

Alternatively, a method of sampling call stack may be used to construct a dynamic call graph. The sampling call stack method calls for periodic saving of call stack information. However, this method may suffer from low precision because some of the call stack information may be lost.

U.S. Pat. No. 6,662,358 describes a combined method of tracing and sampling to decrease the overhead from tracing and increase the precision of sampling. This method generates a trace record containing a call stack associated with a program periodically. Also, the trace record contains information of context of execution. During a post-processing, the information of context of execution is compared with samples of the call stack to identify the routine associated with the program, that is, a routine associated with execution of sample data or path of execution of the program. Still, this method may have low precision and involve a lot of hardware resources.

U.S. Pat. No. 6,002,872 describes a method of sampling a call stack. In the method, a periodically occurring event is detected, a call stack associated with a program is identified in response to the detection of the periodically occurring event. Dynamic call graph is created during a post-processing stage by using call stack samples. Drawbacks of this method may still include involving a lot of hardware resources and low precision.

U.S. Pat. No. 6,751,789 describes a method for tracing function calls where trace collection is periodically paused to decrease the overhead. This method may still involve a lot of hardware resources and have low precision.

U.S. Pat. No. 6,049,666 describes a software profiling method where tracing of all functions are executed. This method may involve a lot of hardware resources, and accordingly, may not be applied to a built-in system environment with limited resources.

SUMMARY

According to one general aspect, there is provided a method of generating a dynamic call graph by utilizing information from an operating system (OS) so as to decrease a storage space and free up system hardware resources that run a program or an application.

According to another aspect, there is provided a method of generating dynamic call graphs, including collecting information and post-processing of the collected information. An accessed executable code set is identified once an OS provides information on which pages have been accessed during the information collection operation. In the post-processing operation, dynamic call graphs are generated from the accessed set of executable codes.

According to still another aspect, there is provided a method for generating a dynamic call graph of an observation period having a plurality of sampling periods, the method including collecting information on what program code pages are accessed during each sampling period, defining parts of an executable program code which are accessible during each sampling period according to the collected information, defining a set of functions within the defined parts of the executable program code, generating dynamic call graphs using the defined set of functions for each sampling period, generating accurate dynamic call graphs by deleting erroneous dynamic call graphs from the generated dynamic call graphs through analyzing a program source code, and generating dynamic call graphs for the observation period by combining accurate dynamic call graphs of each sampling period.

The program source code may be a binary code.

The method may further include generating accurate dynamic call graphs for the observation period by deleting erroneous dynamic call graphs from the generated dynamic call graph for the observation period through analyzing the program source code.

A program code page of a memory containing the parts of the executable program code which are accessible during a sampling period is determined by an operating system.

The dynamic call graphs may be generated by using a predetermined algorithm.

The dynamic call graphs may be constructed to be generated in sequence from possible invoked function sets.

The erroneous dynamic call graphs may be deleted at an initial analysis of the program source code.

The erroneous dynamic call graphs may be deleted at an analysis of a binary code.

According to yet another aspect, there is provided a computer-readable storage medium storing a program to generate a dynamic call graph of an observation period having a plurality of sampling periods, including instructions to cause a computer to collect information on what program code pages are accessed during each sampling period, define parts of an executable program code which are accessible during each sampling period according to the collected information, define a set of functions within the defined parts of the executable program code, generate dynamic call graphs using the defined set of functions for each sampling period, generate accurate dynamic call graphs by deleting erroneous dynamic call graphs from the generated dynamic call graphs through analyzing a program source code, and generate dynamic call graphs for the observation period by combining accurate dynamic call graphs of each sampling period.

Other features and aspects will be apparent from the following detailed description, the drawings, and the claims.

Figure 1:
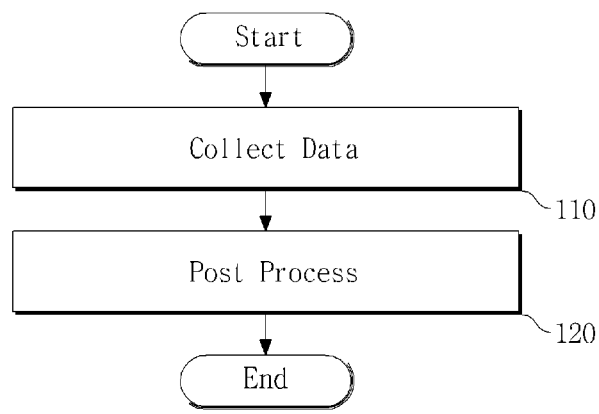
FIG. 1 is a flowchart illustrating an exemplary method of generating a dynamic call graph.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves those of ordinary skill in the art. Descriptions of well-known functions and structures may be omitted for increased clarity and conciseness.

FIG. 1 is a flowchart illustrating an exemplary method of generating a dynamic call graph(s). Referring to FIG. 1, of the method includes collecting data in operation 110, and a post processing in operation 120.

The exemplary dynamic call graph generation method of FIG. 1 may be applicable to any computing apparatus including PCs, servers, and portable terminals.

Information about program execution paths may be collected with low overhead in the data collection operation 110. Accordingly, the data collection operation 110 may be executed on an embedded system with limited resources. During a sample collection period of this operation, information on what parts of a binary code of a program are used is collected. Facilities of an operating system (OS) may be used to collect this information. There may be a plurality of sampling and data may be collected in each sampling period.

The OS may map parts of a program code that are executed into a memory. In the memory, the parts of the program code may be organized as pages. The OS may provide information on which pages have been accessed during a predetermined period. Accordingly, for example, if a set of accessed pages with the program code is identified, a set of accessed parts of the executable program code can be obtained.

The post processing operation 120 may be carried out on a host computer/machine or in a cluster with increased resources. Utilizing a powerful computer system such as the host computer/machine or cluster may increase the accuracy of a dynamic call graph.

During the post processing operation 120, a dynamic call graph(s) may be constructed according to the information obtained in the data collection operation 110.

Based on the information of which code parts have been used during the sample collection period, for example, sets of functions that probably have been invoked during the period may be derived by analyzing the binary code of the program.

If the invoked function sets for one sampling period are identified, possible dynamic call graph sets may be generated in the post processing operation 120. Erroneous, for example, incorrect or undesirable, dynamic call graphs from the sampling period may be cut by analyzing the source (or binary) code.

Dynamic call graphs for a whole observation period may be generated by combining the dynamic call graphs obtained during all sampling periods. Erroneous dynamic call graphs for the whole observation period may be cut by analyzing the source (or binary) code.

Accordingly, consumption of hardware recourses of a system may be decreased, and accuracy of a dynamic call graph of functions may be increased due to the use of a smaller volume of information from an OS (i.e. information used for storing), for example, information of pages of memory which contain a program code of an application which were accessible to the application during a predetermined period of time, and/or due to absence of modification of the application for data collecting in a method of operation. Also, instrumentation of the application may not be needed.

As taught herein, dynamic call graphs may be constructed using information obtainable from an OS such as accessed pages of a program code. Such a method may decrease hardware resource usage, using less information storage space to generate the dynamic call graphs, even in comparison to a call stack sampling method.

The information obtainable via the OS may be a page in a memory containing accessible application codes within a particular period, without modification to the application during the collection process.

Therefore, using the exemplary method, accurate dynamic call graphs may be generated in, for example, systems monitoring multiple types for the purpose of software profiling or different types of monitoring systems, while decreasing the hardware resource requirement. The exemplary method of generating dynamic call graphs may also be implemented in embedded systems where hardware resources are limited.

Figure 2:
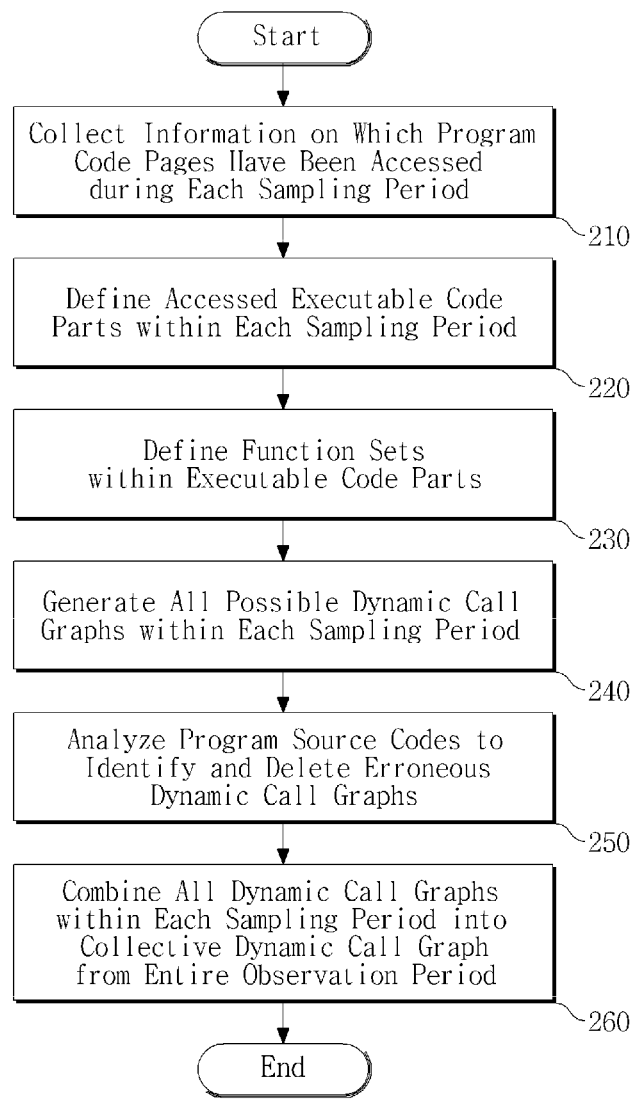
FIG. 2 is a flowchart further illustrating the method of FIG. 1.

FIG. 2 is a flowchart further illustrating the method of FIG. 1.

The overall observation (or supervision) period of a program behavior may be separated into a plurality of sample collection (or sampling) periods. The exemplary method may operate in a built-in system with limited resources.

Referring to FIGS. 1 and 2, the data collection operation 110 of FIG. 1 may include operations 210 and 220 of FIG. 2.

Information about what program code pages have been accessed for each sampling period is collected in the operation 210. Executable code parts, that is, parts of a program code, that have been accessed are defined for each sampling period according to the information obtained in the operation 210, in operation 220. For example, an OS may be used to collect information on accessible parts of a program code in accessible pages of a memory during each sampling period. In the memory the parts of the program code are organized in the form of pages. For example, a memory page 1 of the memory may include a function A and function B, and information indicating whether the memory page 1 is accessed or not, and a memory page 2 of the memory may include a function C and function D, and information indicating whether the memory page 2 is accessed or not. The OS may provide the information of the memory page with program codes which were accessible during each sampling period of the observation. After identifying pages of a memory with program codes which were accessible, a set of code parts which have been accessible in the previous sampling period may be defined in a binary file.

The post-process operation 220 of FIG. 1 may include operations 230, 240 and 250 of FIG. 2.

According to information on which parts of a program code have been used during a sampling period, a set of functions may be defined, which are located in accessible parts of the program code and, possibly, have been invoked during the sampling period, through an analysis of a binary program code.

Referring to FIG. 2, a set of functions invoked for each sampling period is defined in operation 230. Possible dynamic call graphs for each sampling period are generated in operation 240. Dynamic call graphs may be generated by using an algorithm or by generation of sequences from the set of possible accessed functions. Erroneous dynamic call graphs may be deleted by analyzing the program source code (initial or binary code) in operation 250.

Dynamic call graphs from each sampling period are combined to produce dynamic call graphs for the overall observation period in operation 260.

Analysis of the program source code (initial or binary code) may be further performed with respect to the dynamic call graphs for the overall observation period, so as to delete erroneous dynamic call graphs from the combined dynamic call graphs. The combined dynamic call graphs for the overall observation period may be represented as a dynamic call graph for the overall observation period.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable recording medium may be distributed among computer systems connected through a network and computer-readable codes may be stored and executed in a decentralized manner.

A computing system or a computer described above may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for generating a dynamic call graph of an observation period having a plurality of sampling periods, the method comprising:
   collecting information on what program code pages are accessed during each sampling period of the program's execution;
   defining parts of an executable program code which are accessible during each sampling period according to the collected information;
   defining a set of functions that have been probably invoked during each sampling period within the defined parts of the executable program code;
   generating a set of possible dynamic call graphs using the defined set of functions for each sampling period;
   generating accurate dynamic call graphs for each sampling period of the observation period in operation by deleting dynamic call graphs, which were erroneously generated due to a misinterpretation of the collected information, from the generated dynamic call graphs through analyzing a program source code; and
   generating a dynamic call graph for the overall observation period in operation by combining the accurate dynamic call graphs for each sampling period of the overall observation period in operation, wherein
   the erroneously generated call graphs include incorrect or undesirable call graphs generated from sampled data; and
   the information on what program code pages are accessed during each sampling period is provided by an operating system and contains accessible application codes during each sampling period.

2. The method of claim 1, wherein the program source code is a binary code.

3. The method of claim 1, further comprising generating accurate dynamic call graphs for the observation period by deleting erroneous dynamic call graphs from the generated dynamic call graph for the observation period through analyzing the program source code.

4. The method of claim 1, wherein the dynamic call graphs are generated by using a predetermined algorithm.

5. The method of claim 1, wherein the dynamic call graphs are constructed to be generated in sequence from possible invoked function sets.

6. The method of claim 1, wherein the erroneous dynamic call graphs are deleted at an initial analysis of the program source code.

7. The method of claim 1, wherein the erroneous dynamic call graphs are deleted at an analysis of a binary code.

8. A non-transitory computer-readable storage medium storing a program to generate a dynamic call graph of an observation period having a plurality of sampling periods, the program comprising instructions to cause a computer to:
   collect information on what program code pages are accessed during each sampling period of the program's execution;
   define parts of an executable program code which are accessible during each sampling period according to the collected information;

define a set of functions that have been probably invoked during each sampling period within the defined parts of the executable program code;

generate a set of possible dynamic call graphs using the defined set of functions for each sampling period;

generate accurate dynamic call graphs for each sampling period of the observation period in operation by deleting dynamic call graphs, which were erroneously generated due to a misinterpretation of the collected information, from the generated dynamic call graphs through analyzing a program source code; and generate a dynamic call graph for the overall observation period in operation by combining the accurate dynamic call graphs for each sampling period of the overall observation period in operation, wherein the erroneously generated call graphs include incorrect or undesirable call graphs generated from sampled data; and the information on what program code pages are accessed during each sampling period is provided by an operating system and contains accessible application codes during each sampling period.

* * * * *